Patented Feb. 16, 1926.

1,573,482

UNITED STATES PATENT OFFICE.

RICHARD A. DALTAN, OF PHILO, OHIO.

FIRE BRICK OR BLOCK.

No Drawing. Application filed May 16, 1925. Serial No. 30,878.

*To all whom it may concern:*

Be it known that I, RICHARD A. DALTAN, a citizen of the United States, residing at Philo, in the county of Muskingum and State of Ohio, have invented certain new and useful Improvements in Fire Bricks or Blocks, of which the following is a specification.

My invention relates to a brick or block, to be used as a fire brick, and which will withstand the action of high heat.

In accordance with my invention, I produce a brick or block, which is capable of successfully withstanding the action of high heat, that is a temperature from 3400° F. to 4000°F. The brick or block will not flux, and is highly resistant to the cutting action of flame, and the abrasive action of the furnace charge, or swiftly moving dust laden gases. The brick can be produced at a less cost than the ordinary fire brick, and is much more durable.

In accordance with my invention, I produce a brick having a body formed of the following materials, preferably combined in substantially the proportions by weight stated:

|  | Parts by weight. |
|---|---|
| Slag or cinders from a high temperature forced draft furnace | 6 |
| Fire cement | 2½ |
| Portland cement | ¼ |

It is essential that the slag or cinders be obtained from a high temperature furnace having a forced draft, and the slag or cinders cannot be properly used when obtained from a furnace operated at a temperature beneath 2400° F. The slag or cinders should also be obtained from a furnace having a forced or blower draft, as in such a furnace, all of the ashes are blown out from the cinders or clinkers, which vary considerably in size. The slag or cinders, thus obtained, are allowed to cool, and are then suitably ground. The slag or cinders may vary from fine particles to about ½ inch in size. I have found that I cannot obtain satisfactory results by using slag or cinders from an ordinary low temperature furnace which slag or cinders may be present in a granulated form, as the same would be too expansive and would also absorb moisture. The slag or cinders from the high temperature forced draft furnace is free from these disadvantages, has a low coefficient of expansion and does not readily absorb moisture.

Fire cement is a cement which will not set hard at atmospheric temperatures, but does set hard, when subjected to heat, and may be heated to about 2600° F., and will then be found to have set hard. After it has set, it may be subjected to much higher temperatures, without injury.

The Portland cement is employed to cause the body of the brick to set sufficiently hard at atmospheric temperatures, so that it may be handled prior to being baked in the furnace.

The slag or cinders, fire cement, and Portland cement are thoroughly mixed with sufficient water, to produce a plastic mass, which may be then introduced into a suitable mold, or otherwise suitably worked into a block, constituting the body of the brick. This mass will set sufficiently hard at atmospheric temperatures, due to the presence of the Portland cement, to permit of the handling of the brick.

I also coat one, any, or all of the faces of the body of the brick. This coating embodies the following ingredients, preferably combined in the following proportions:

|  | Parts by weight. |
|---|---|
| Granulated carborundum | 4 |
| Fire cement | 3½ |
| Portland cement | ½ |

These ingredients are thoroughly mixed with sufficient water to produce a plastic mass. The face or faces of the body of the brick is then coated with this composition, to produce a face of about ½ inch thick. The facing may be applied in any suitable manner, as is well known in the block molding art, and the facing composition may be first introduced into the bottom of the mold and the body forming composition introduced into the mold on top of the facing composition, and both compositions allowed to set and harden, at atmospheric temperatures. If desired the body of the brick could be first formed and allowed to set and the facing or coating applied to the same, which would subsequently be allowed to set.

In the facing composition the Portland cement is employed to cause such facing composition to set sufficiently hard at atmospheric temperatures to permit of handling, and the fire cement is employed to cause the mass to set hard, after the brick is heated or burned at a high temperature. Carborundum is employed on account of its heat resisting properties.

After the brick has been thus produced and allowed to set an atmospheric temperatures, it is placed in a furnace and subjected to a temperature of about 2600° F. for about 4 hours, and is then allowed to cool back to about 1200° F. and is retained at this temperature for about 5 hours. After being cooled back to 1200° F., the temperatures of the brick will then depend upon the temperatures of the furnace of which they form a part. After the brick have set at atmospheric temperatures, due to the Portland cement, they are built into the furnace of which they form a part and are burned or baked in this furnace, while of course the invention is in no sense restricted to this procedure, as they could be baked or burned before being built into the furnace.

The brick thus produced will withstand from about 3500° F. to 3600° F. without fusing and has about 3 times the life of the ordinary fire brick, when subjected to high temperatures, and may also be produced at a lower cost.

It is to be understood that the form of my invention herewith shown and described is to be taken as a preferred example of the same, and that the proportions of the ingredients may be somewhat varied, and chemical equivalents employed, without departing from the spirit of my invention or the scope of the subjoined claims.

Having thus described my invention, I claim:

1. A fire brick or block including a body portion, said body portion comprising slag from a high temperature forced draft furnace which is free from ashes, a fire cement which sets hard at a high temperature, Portland cement which sets hard at atmospheric temperatures, and a facing composition comprising divided carborundum, a fire cement which sets hard at a high temperature, and Portland cement which sets hard at atmospheric temperature.

2. A fire brick or block containing slag from a high temperature forced draft furnace, a high temperature setting fire cement, Portland cement, and divided carborundum.

3. A fire brick or block having a composition constituting a body portion of the same, said composition comprising substantially six parts by weight of slag from a high temperature forced draft furnace substantially 2½ parts by weight of a fire cement which sets hard at a high temperature, substantially ¼ part by weight of a cement which sets hard at atmospheric temperature, and a facing composition comprising substantially 4 parts by weight of granulated carborundum, substantially 3½ parts by weight of a fire cement which sets hard at a high temperature, and substantially ½ part by weight of a cement which sets hard at atmospheric temperature.

4. A fire brick or block containing slag from a high temperature forced draft furnace, a high temperature setting fire cement, and Portland cement.

In testimony whereof I affix my signature.

RICHARD A. DALTAN.